US010790527B2

(12) United States Patent
Khan et al.

(10) Patent No.: US 10,790,527 B2
(45) Date of Patent: Sep. 29, 2020

(54) IN SITU FABRICATED DIRECT METHANOL FUEL CELL (DMFC)

(71) Applicant: Westfield Group Services, Inc., Allentown, PA (US)

(72) Inventors: Yasin N. Khan, Allentown, PA (US); Asanga Ranasinghe, Dorango, CO (US)

(73) Assignee: Westfield Group Services, Inc., Allentown, PA (US)

( * ) Notice: Subject to any disclaimer, the term of this patent is extended or adjusted under 35 U.S.C. 154(b) by 44 days.

(21) Appl. No.: 15/873,590

(22) Filed: Jan. 17, 2018

(65) Prior Publication Data

US 2018/0205104 A1    Jul. 19, 2018

Related U.S. Application Data

(60) Provisional application No. 62/446,870, filed on Jan. 17, 2017.

(51) Int. Cl.
| | |
|---|---|
| *H01M 8/1072* | (2016.01) |
| *H01M 8/1011* | (2016.01) |
| *H01M 8/1004* | (2016.01) |
| *H01M 4/92* | (2006.01) |
| *H01M 4/88* | (2006.01) |

(52) U.S. Cl.
CPC ......... *H01M 8/1072* (2013.01); *H01M 4/881* (2013.01); *H01M 4/8853* (2013.01); *H01M 4/921* (2013.01); *H01M 4/926* (2013.01); *H01M 8/1004* (2013.01); *H01M 8/1011* (2013.01); *Y02E 60/523* (2013.01); *Y02P 70/56* (2015.11)

(58) Field of Classification Search
CPC ........................................ H01M 8/1004–1072
See application file for complete search history.

(56) References Cited

U.S. PATENT DOCUMENTS

2009/0004550 A1* 1/2009 McFarland .............. C25D 5/02
429/483

* cited by examiner

*Primary Examiner* — Osei K Amponsah
(74) *Attorney, Agent, or Firm* — David G. Oberdick

(57) ABSTRACT

A method of producing an electrochemical fuel cell device with one or more electrodes containing one or more electrocatalysts. The method involves the steps of, first, affixing a semi-permeable membrane with inhomogeneous conduction pathways to a conducting surface of a first electrode in a predetermined configuration to form a first electrode assembly. This assembly is then immersed in an electrolyte containing at least one electrochemical precursor with for forming an active electrocatalyst on the conducting surface of the first electrode when a potential is applied to the first electrode. The same process can occur with a second electrode assembly which can be joined to the first electrode assembly before or after the electrocatalyst deposition.

7 Claims, 20 Drawing Sheets

IN SITU FABRICATED DIRECT METHANOL FUEL CELL (DMFC)

CROSS-REFERENCE TO RELATED APPLICATIONS

This application claims priority to U.S. Provisional Application Ser. No. 62/446,870, filed Jan. 17, 2017, which application is incorporated by reference herein in its entirety.

STATEMENT REGARDING FEDERALLY SPONSORED RESEARCH

Not applicable.

BACKGROUND OF THE INVENTION

Fuel cells are electrochemical devices that make use of permeable/semi-permeable membranes/ceramic type materials (the most commonly known of which is Nafion® as shown in FIG. 1) attached to electrodes on either side/face containing electrocatalysts have limitations. It would be of great benefit to both the cost and efficiency of such devices if the electrocatalyst could be applied to the working electrode surfaces after the semi-permeable membrane 10, as shown in FIG. 1, is attached in a way such that only the conducting/active channels used for the ion/mass transport process and that run continuously across the membrane 10 from one surface to the opposite surface, are in contact with the electrocatalyst (which is generally an expensive metal such as Platinum ("pt") or Ruthenium ("Ru") metals).

In existing fuel cells, the catalyst particles are coated/painted as a mixture in carbon paste first on the electrodes of the cell, and the membrane 10 then is placed between the electrodes followed by hot mechanical pressing. In general, any membrane 10 that is permeable/semi permeable will contain pores through which the protons will travel across from the anode to the cathode side. In the specific case of Nafion® or other polymeric membranes 10 proton migration takes place through hydrophilic channels or domains 11, formed between hydrophic domains 12 and consisting of water, protons and sulfonic groups. The width of the channels 11 is 1-100 nm. The catalyst consists of very small metal particles (e.g., Pt nano clusters) at both anode and cathode. These are supported/embedded/hosted on small carbon particles which are, in turn, supported by a carbon cloth that serves as an electrode (ultimately either the anode or the cathode). When the membrane 10 is pressed against the carbon cloth, to make the cell, there is no reason that the catalyst particles (e.g. Pt) will be in contact with a hydrophilic domain 11 or the conducting domain in a ceramic or other type of membrane 10. The electrocatalytic/fuel cell reaction process that makes the cell function requires that protons are made at the anode and travel through the membrane 10 to the cathode where they are reduced. The catalyst particles that are located in a hydrophobic domain 12 (or under the ceramic wall/non-conducting in other membranes) cannot produce protons, hence electricity. The particles that are located in a hydrophilic channel or domain 11 are active only if that domain crosses the membrane and also has a catalyst particle at the end that reaches the cathode. All catalyst particles (e.g. Pt) that do not satisfy this condition are not effectively being used or wasted. This increases the cost of the cell.

In 2007, Ranasinghe, et al patented background technology, as discussed at U.S. Pat. No. 6,502,402 B1, to show a functioning hydrogen fuel cell that uses at least 1000 times less Pt loading at each electrode to produce remarkable I-V characteristics for a functioning proton exchange membrane (PEM) hydrogen fuel cell. Ranasinghe further mentions that similar methods could be used to manufacture a direct methanol fuel cell, or DMFC, but there was no past evidence or demonstration of a working DMFC, nor where there any preliminary studies towards codeposition of Pt and any other metal species that will inhibit the carbon monoxide (CO) poisoning of Pt upon operation of the DMFC. There have been also been past studies performed on the CO poisoning and avoidance of poisoning of the Pt catalyst, and the most common candidate that eliminates CO is Ru-based metallic deposits (such as RuOH or RuO).

BRIEF SUMMARY OF THE INVENTION

The present invention is a modified method of synthesizing fuel cells and other electrochemical devices requiring (i) electrocatalysts, in contact with (ii) semi-permeable membranes as used in a variety of electrochemical devices, including fuel cells in a preferred embodiment, as well as any electrochemical device that uses ion selective membranes and metal catalysts.

BRIEF DESCRIPTION OF THE SEVERAL VIEWS OF THE DRAWINGS

Embodiments of the present invention will now be described, by way of example only, with reference to the accompanying drawings for the purpose of illustrating the embodiments, and not for purposes of limiting the invention, wherein.

DETAILED DESCRIPTION OF THE INVENTION

In a preferred embodiment, the present invention consists of a method of producing an electrochemical device with one or more electrodes which contain electrocatalysts prepared by the following unique methodology.

Figure 1:
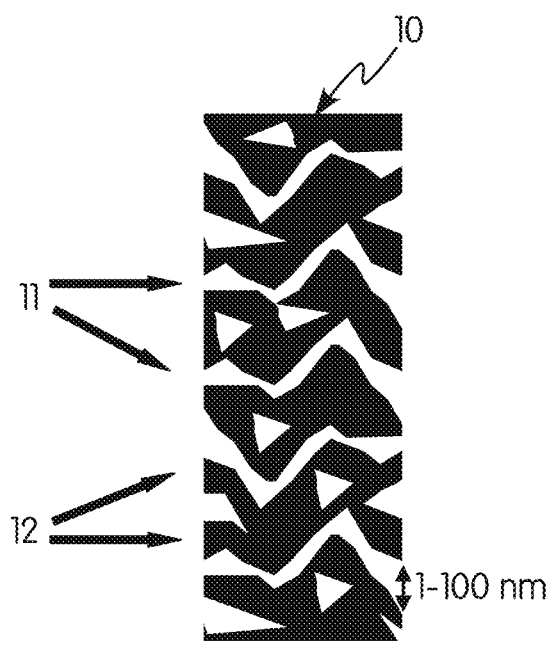
FIG. 1 is a side cross-sectional view of a membrane used in connection with existing fuel cells.
Figure 2:
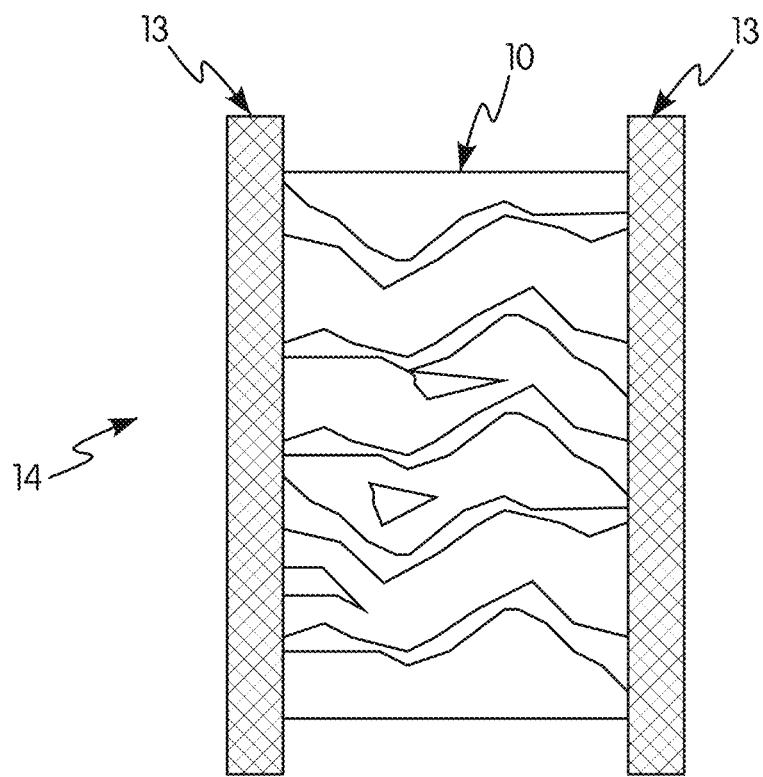
FIG. 2 is a side cross-sectional view of an assembled electrode Polymer Electrolyte Membrane ("PEM") for use in a fuel cell.

First, a semi-permeable membrane 10 affixed or applied to the conducting surface of at least permeable electrode or electrodes 13 (such as, in one preferred embodiment, carbon cloth or carbon paper leaded with a fine paste of carbon ink/powder) in a predetermined configuration to be used as an assembled electrode Polymer Electrolyte Membrane or "PEM" 14 in a final working fuel cell device, as shown in FIG. 2. The semi-permeable membrane 10 can be a ceramic or other similar semi-permeable membrane.

This system configuration is then immersed in an electrolyte containing electrochemical precursors suitable for forming an active electrocatalyst on one or both of the conducting electrodes 13. Examples of suitable electrochemical precursors are Platinum, Ruthenium, Platinum-Ruthenium alloys and any other metallic binary, ternary or quaternary metal solutions.

Figure 3:
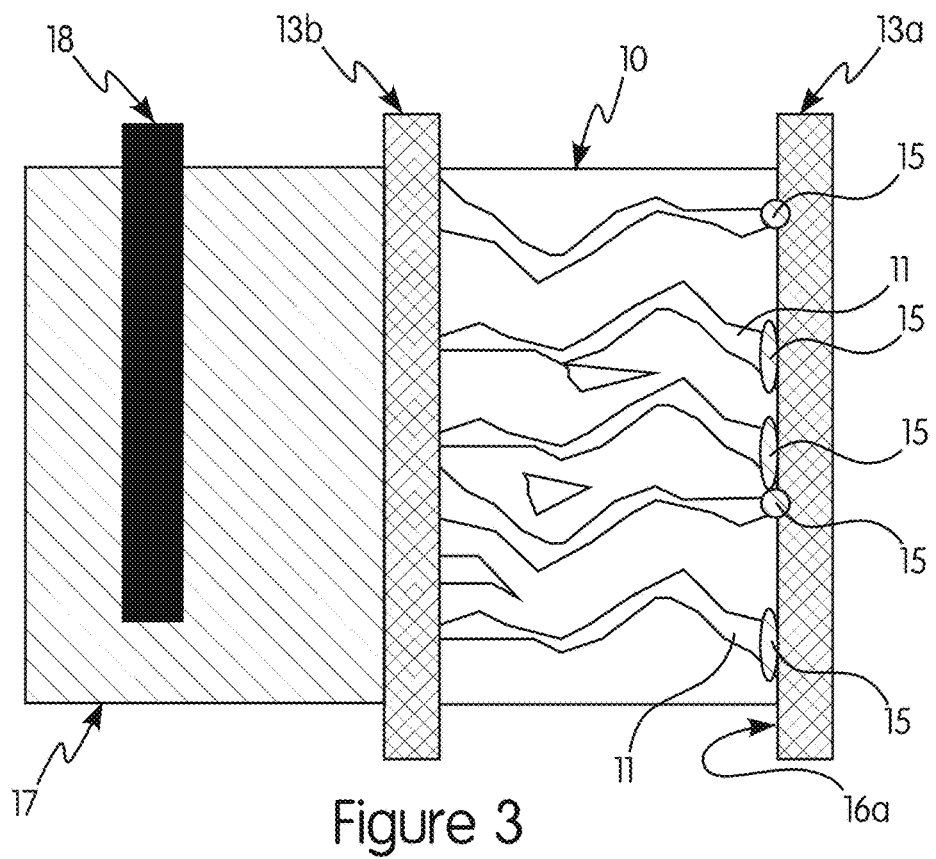
FIG. 3 is a side cross-sectional view of an assembled electrode PEM showing the step of depositing an electrocatalyst on a first electrode.

As shown in FIG. 3, the electrocatalyst is then deposited electrochemically on a selected electrode 13a by applying a potential to the electrode 13a, whereby it becomes a cathode, and specifically and intentionally guiding the precursor ions through the hydrophilic or inhomogeneous conduction pathways 11 in the semi-permeable membrane or ceramic 10 to reach a first conducting surface 16a, where the electrocatalyst deposit 15 is formed by an electrochemical reduction reaction. Only the electrode 13a where the electrocatalyst is desired has an attracting potential. The second electrode 13b is associated with a counter electrode or anode 18 and an ionic solution 17 with a cation electrolyte, such as Pt in one embodiment.

Figure 4:
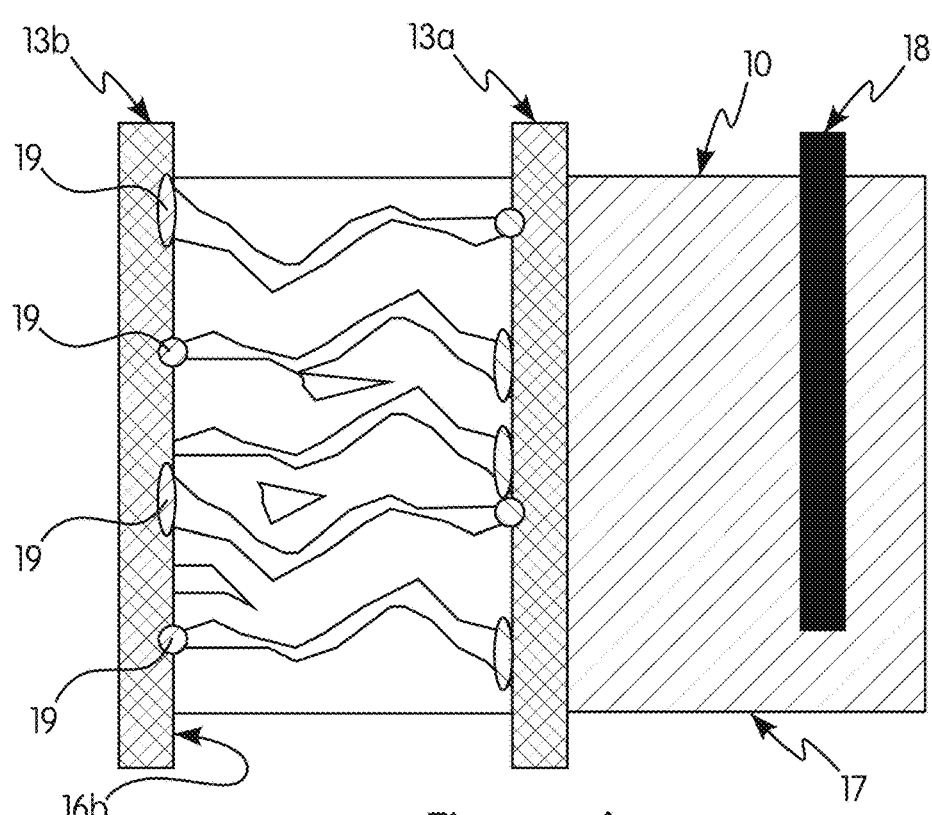
FIG. 4 is a side cross-sectional view of an assembled electrode PEM showing the step of depositing an electrocatalyst on a second electrode.

Referring to FIG. 4, if a second electrode 13b is used for deposition (as in a fuel cell), the electrocatalyst may be of the same or different material as that used with the first electrode 13a. The electrocatalyst deposit 19 is formed on the second/opposite electrode 13b, after the deposition on the first electrode 13a is complete, by applying a potential to the second electrode 13b, whereby it becomes a cathode, and using a second conducting surface 16b to deposit the electrocatalyst on the electrode 13b after guiding the ions through the membrane 11. A working electrode or anode 18 is located opposite electrode 13b (and outside of electrode 13a), as shown in FIG. 4, together with an associated ionic solution 17 with a cation electrolyte, such as PtRu can be used in another embodiment. As described more fully below, this process step can be used for the codeposition of Pt and Ru, or other electrocatalysts.

In one preferred embodiment, a Nafion® membrane 10 is placed between carbon conducting electrodes 13a and 13b and their respective internal surfaces 16a and 16b. Such electrodes can include carbon cloth/paper, porous less resistive metals/metallic mixtures and conductive coated porous ceramics. Platinum ("Pt") salts are then added to an electrolyte in one embodiment. By applying a negative potential to the desired electrode, the Pt ions will be guided through the conducting channels 11 of the Nafion®, and the Pt metal is cathodically deposited on the electrode with the negative potential.

Figure 5:
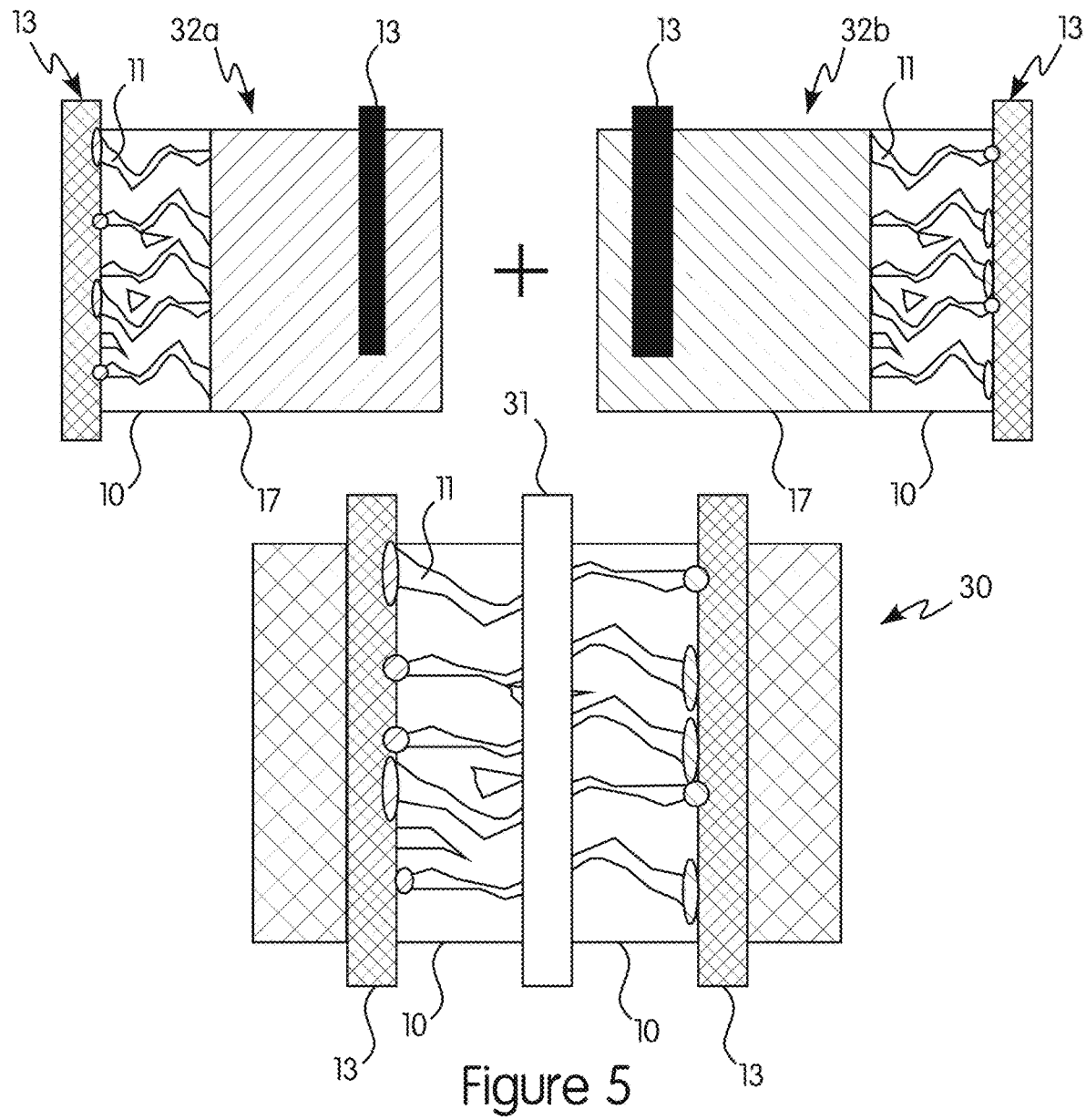
FIG. 5. is a side cross-section view of the process whereby a fuel cell is formed by "split-join" synthesis.

As shown in FIG. 5, by utilizing this technology, a fuel cell 30 with two electrodes 13 can be made, alternatively, by using a porous coupling layer 31 and "split-join" synthesis to couple 2 half membrane electrode assemblies 32a and 32b (each an "MEA"). In this alternative embodiment, catalyst particles are deposited from their respective ion solutions and on half membrane electrode assemblies 32a and 32b, which are then coupled through a porous coupling layer 31, which provides a continuous pathway for ion transport across the membrane 10. To facilitate this coupling, a membrane 10 is first placed between two electrodes 13 (in one embodiment, carbon cloth, with or without carbon particles on them) or any other electrodes 13 used in making a fuel cell, and the membrane is impregnated with a solution containing the salt of the metal to be deposited (the catalyst). The salt is then electrolyzed to deposit the metal (the catalyst) on one of the electrodes 13. In this way, the catalytic particles are formed only inside those channels, i.e., the hydrophilic domains 11 that cross the membrane 10. Thus, no catalytic particle is wasted. Moreover, there is very good control of the size of the particles formed. This coupling can work for any membrane 10 and any catalyst, be it unary, binary or ternary. In addition, this coupling can be utilized by using two different types of membranes/ceramics 10 for separate cathodes and anodes 13.

Figure 7A:
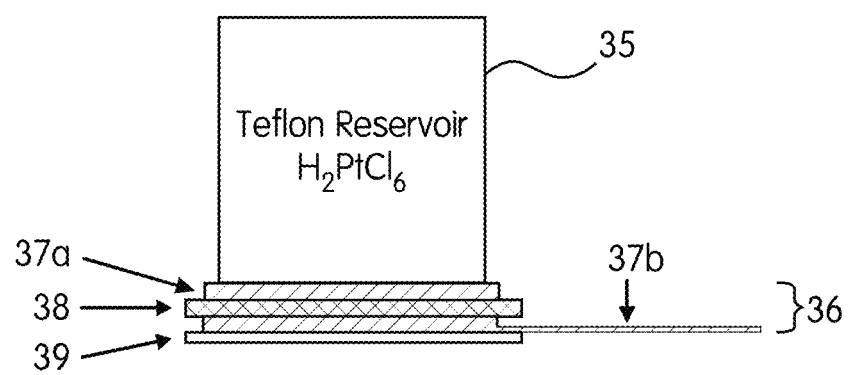
FIG. 7A is a side view of a Teflon™ reservoir that can be used in one embodiment of the method of this invention.
Figure 7B:
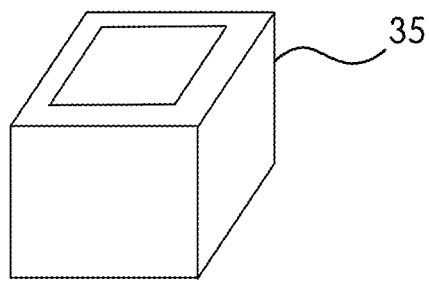
FIG. 7B is a front perspective view of a Teflon™ reservoir that can be used in one embodiment of the method of this invention.

The effectiveness of a fuel cell created through method of the present invention has been demonstrated by experimentation. Specifically, an in situ fabricated direct methane fuel cell was assembled using the following steps. First, commercially available Nafion® membranes (112 and 117) were purchased, and commercially available hydrophobic Teflon™ treated carbon cloth electrodes coated with Vulcan™ XC 72 (E-TEK, 0.5 mg/cm$^2$) also were purchased. Prior to construction of the half MEA, the Nafion® membrane was hydrated by boiling in 0.5M $H_2SO_4$ for 30 minutes and then boiling in deionozed or DI water for 30 minutes. The carbon cloth electrode was treated with a Nafion® ionomer solution (0.5 mg/cm$^2$) and allowed to air dry for 2 hours. Once the Nafion® membrane and carbon cloth electrode were prepared, the membrane and the carbon cloth electrode were hot pressed at 3000-4000 lb/in$^2$ using a hot press for 3-5 minutes at the $T_g$ of Nafion® to create a half MEA. Once the half MEA was constructed, Pt was deposited using a 3 electrode setup and potentiostat. The half MEA was then placed in a Teflon™ reservoir 35, as shown in FIGS. 7A and 7B. Referring to FIG. 7A, the half MEA 36 includes the carbon cloth electrode 37a, a carbon contract for the working electrode 37b and Nafion® membrane 38. The reservoir also includes a cover 39. Alternatively, the substrate of the working electrode can be directly immersed in the $H_2PtCl_6$ solution. However, the advantages of using the Teflon™ reservoir are that: (1) the half MEA is held tightly together during the deposition process, (2) the membrane was soaked with $H_2PtCl_6$ for at least 1 hour prior to deposition of Pt, (3) the wastage of solution was minimized due to the small volume of the reservoir ~20 ml, and (4) Pt deposition is prevented at the opposite face (not through) Nafion® of half MEA.

Figure 8:
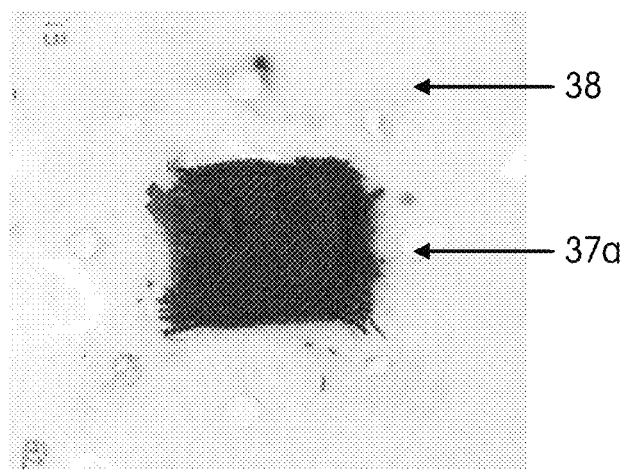
FIG. 8 is a photograph of a fuel cell constructed using the method of the present invention.
Figure 9:
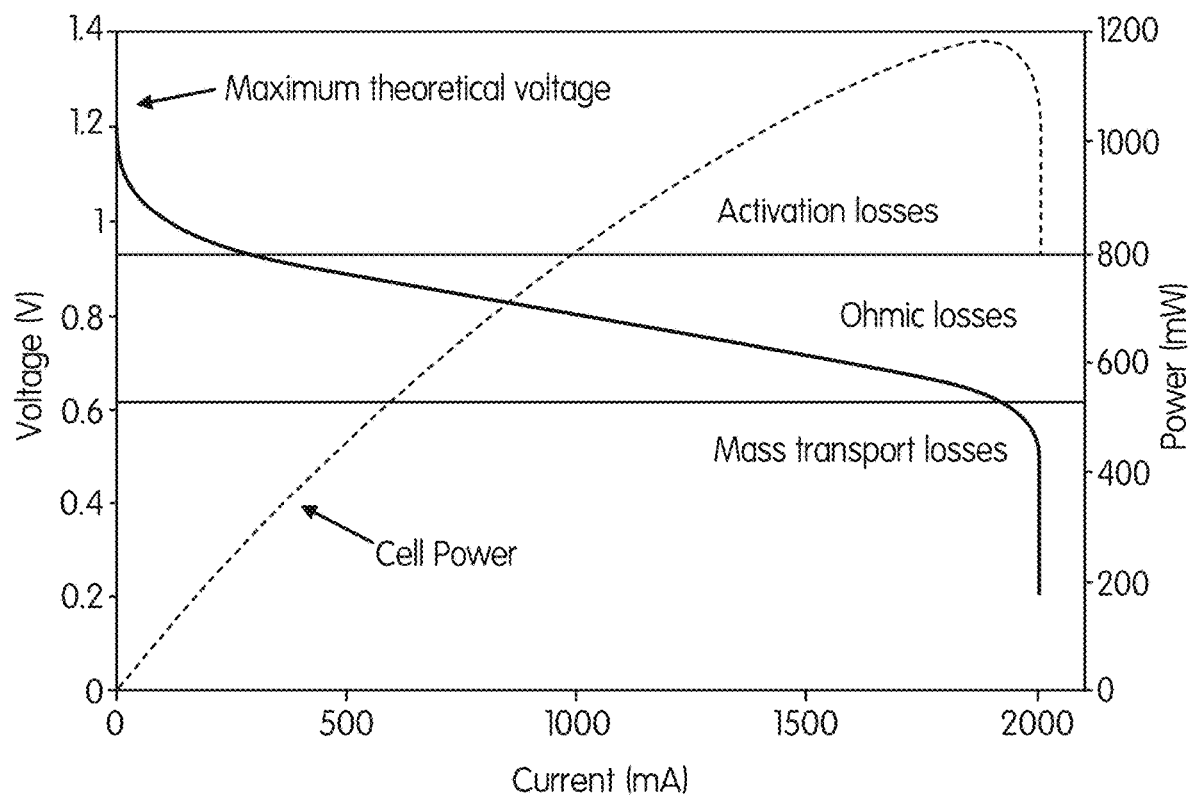
FIG. 9 is a graph showing the ideal current-voltage or I-V curve for a fuel cell.

An example of a fuel cell constructed using this method is shown in FIG. 8, with the carbon cloth electrode 37a shown on membrane 38. The resulting fuel cell was then tested. In this respect, the current-voltage or I-V curve of the fuel cell was tested and compared to a commercial fuel cell. At the beginning of such testing, the fuel cell was supplied with $H_2$ and air (or pure $O_2$) and the voltage was measured. This is called the open circuit voltage (OCV). At this stage no external load (resistance) was applied to the fuel cell, and, therefore, no current flowed from the fuel cell. During this stage fuel cross over and electron conduction took place simultaneously. An external load then was applied, so that a net current flowed through the external load. A decrease in the initial voltage was observed due to the slow rare of reduction of oxygen at the cathode. The net overall rate of electrochemical reactions is proportional to the density of current (current divided by the active area of the fuel cell, generally the electrode surface area). As the external load is increased, the fuel cell voltage becomes smaller due to the membrane resistance for mass transport. Finally, the reactants will be consumed faster that it was supplied to the electrodes, which result in a sharp decrease of the cell voltage as shown in FIG. 9. If there are no other external contributing factors, as described above, the ideal fuel cell current-voltage or I-V curve should have the characteristics given by the dotted line in FIG. 9.

The MEAs and associated fuel cell constructed by the above-described method next were tested as hydrogen fuel cells using a commercially available FC 850C compact fuel cell test station equipped with a single cell with PEM fuel cell hardware. This type of test station has capabilities to test hydrogen as well as direct methanol fuel cells (DMFCs). In the testing that was conducted of the fuel cells created by the method of the present invention, the active surface area of the fuel cell that could be tested was 5 cm$^2$.

Figure 10:
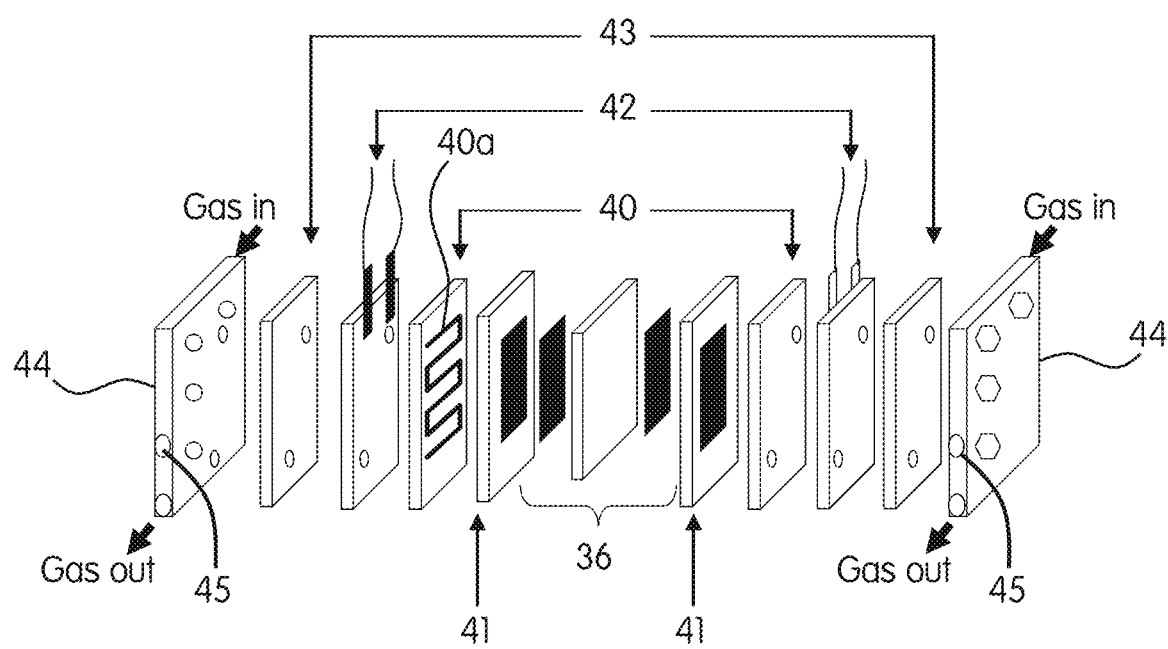
FIG. 10 is an exploded perspective view of the component assembly of a fuel cell constructed in accordance with the method of the present invention and as submitted for testing.

The fuel cell constructed in accordance with the method of this invention (and associated components) and that was tested is shown in FIG. 10. In particular, the constructed MEA 36 was placed between two graphite flow plates 40 in the configuration shown in FIG. 10, with internal Teflon™ gaskets 41 used to avoid gas cross over during the fuel cell operation. The graphite flow plates 40 were designed with grooves 40a facing towards the MEA for gas diffusion from the anodic and cathodic sides. Current collector plates 42 were located outside of the flow plates 40 and were made with gold to avoid resistance during the application of the load to scan I-V features of the fuel cell. Teflon™ insulators 43 were located outside of the current collector plates 42, and flow channels 44, each with a heat cartridge 45, were located outside of the insulators 43. The MEA 36 was tightly secured with torque wrenches before testing as a fuel cell.

Figure 11:
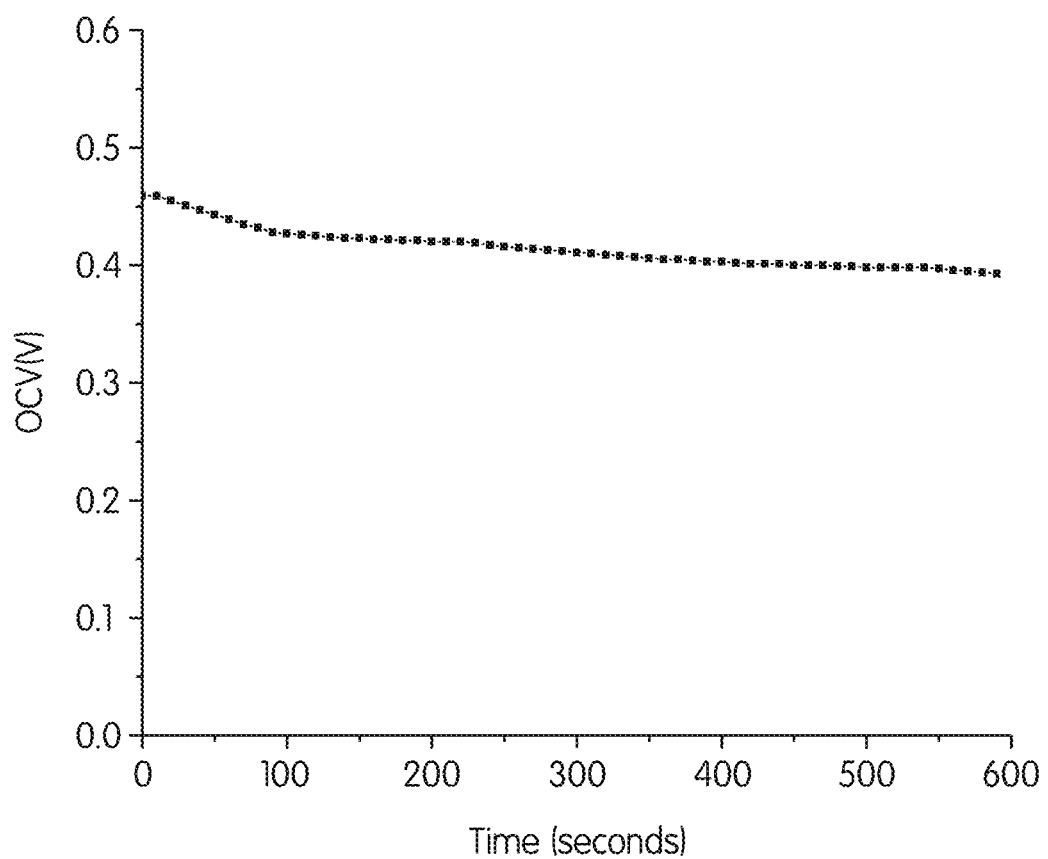
FIG. 11 is a graph showing the scanning for open circuit voltage (OCV) of the fuel cell tested as shown in FIG. 10 and until current output stabilizes with time.

The fuel cell testing was initiated by holding the cell at a constant potential (~0.4V) while exposing the anode to a constant flow of $H_2$ and air at 0.1454 L/min and 0.199 L/min respectively with the stoichiometric ratios of 4.5 and 6 for the anode and the cathode respectively. The flow rates of gases were calculated based on the assumption of production of a current density of 1 A/cm$^2$ from the fuel cell. A constant back pressure was applied for the anode and the cathode of 5 psi and 8 psi respectively, to achieve maximum utilization of the fuel. The fuel cell was maintained at a constant temperature of 65° C. (to compare with literature) using heat cartridges 45 as shown in FIG. 10. The system was scanned for 4-8 hours until the current output from the fuel cell stabilized, as shown in FIG. 11. In particular, FIG. 11 shows the scanning for open circuit voltage (OCV) until current output stabilizes with time.

After stabilization of the current output, an external resistance was applied to the fuel cell. During this phase the supply of $H_2$ to the anode and air to the cathode were changed to 0.053 L/min and 0.2627 L/min respectively at 1 atm pressure. These values are obtained with corrections for appropriate stoichiometric ratios for the gases (1.2 for the anode and 2.5 for the cathode) supplied to the anode and the cathode at a current density of 1 A/cm$^2$. Additionally, the anode and the cathode temperatures were fixed at 73° C., and the fuel cell temperature was maintained at a constant temperature of 80° C. through-out the I-V scanning.

Figure 12:
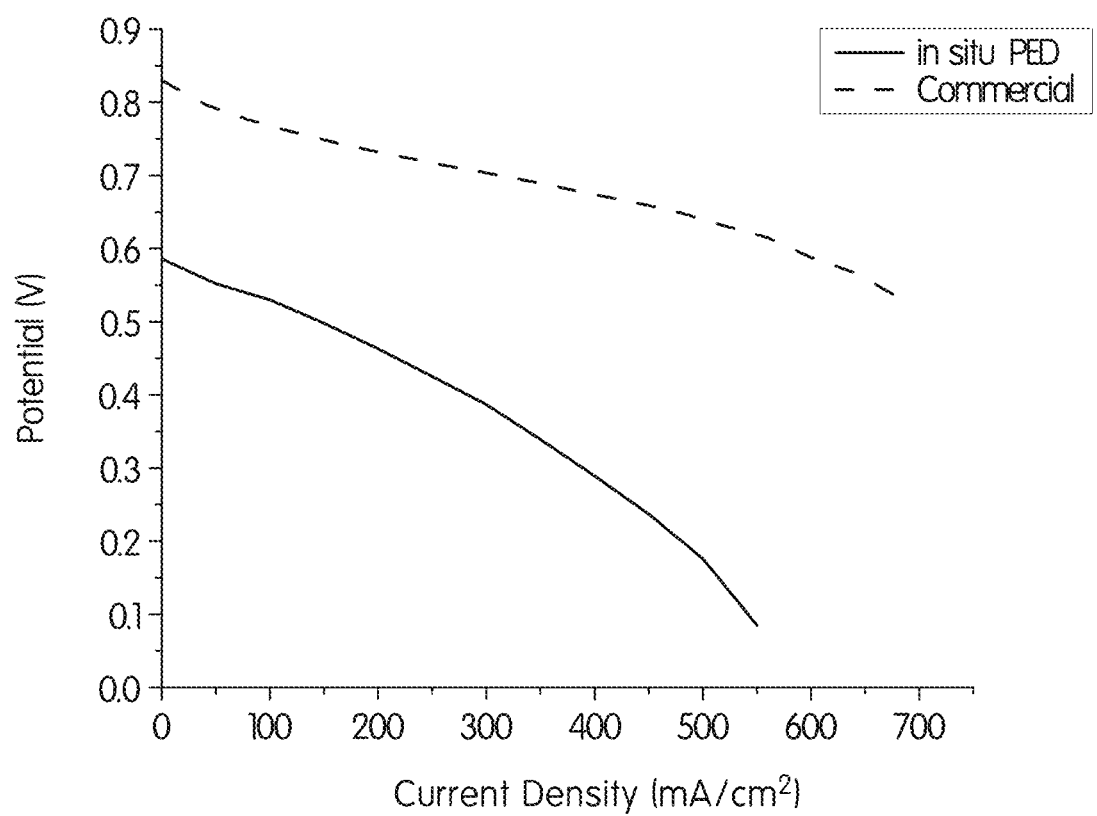
FIG. 12 is a graph showing a comparison of the I-V features for hydrogen fuel cell made from in situ PED of Pt through MEA made in accordance with the method of the present invention and a commercially available fuel cell.
Figure 13:
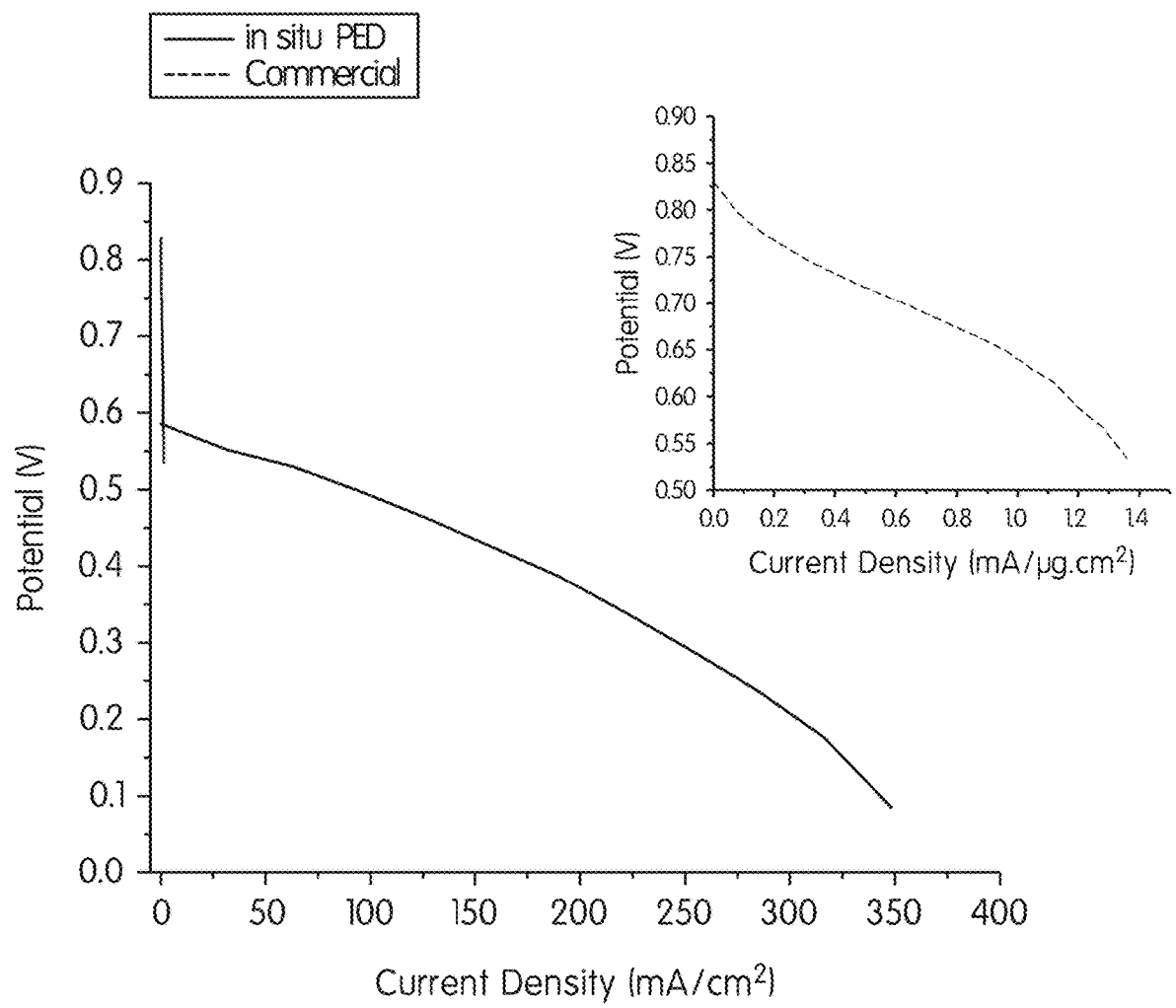
FIG. 13 is a large graph showing the I-V curve obtained from an MEA made by in situ PED of Pt in accordance with the method of the present invention and as normalized with rest to the amount of Pt loading and an inset graph showing, for comparison, the I-V curve for an MEA made using commercially available Pt loaded carbon cloth.

The results of these experiments constitute the very first reports of the in situ PED of Pt though MEAs being fabricated to provide functioning hydrogen fuel cell electrodes. The results also provide encouraging fuel cell performances and with lower Pt loading compared to other conventional methods. In this respect, the reduction of loading in the new fuel cell was on the order of 10. The inductive coupled plasma technique ("ICP") results for Pt loading for the fuel cell made by in situ PED of Pt, as shown by FIG. 12, was found to be 1.58 µg/cm$^2$. This scale is about a maximum of 1000 times less than the conventional loading of Pt in fuel cells. The comparison of the I-V features for hydrogen fuel cell made from in situ PED of Pt through MEA and a commercially available fuel cell are shown in FIG. 12. In FIG. 13, the I-V curves obtained from an MEA made by in situ PED of Pt are shown by a solid line and an MEA made using commercially available Pt loaded carbon cloth is shown by a dashed line.

While an initial examination of these results suggests that a commercially made fuel cell electrodes may gave better fuel cell performance than the electrodes made by in situ PED, when the current density of the fuel cell was normalized with respect to the amount of loading of Pt on the electrode (i.e., mA/mg·cm$^2$), the fuel cell made through in situ PED of Pt was found to be far superior in performance, as shown in FIG. 13. In FIG. 13, the I-V curves are normalized with respect to the amount of Pt loading. The I-V curve for an in situ PED of Pt is shown by the solid line and, in the inset graph, the curve for the MEA made using commercially available Pt loaded carbon cloth is shown by the dotted line. This comparison shows that the commercially available fuel cell was found to produce very less current per mg of loading.

Fuel cell electrodes made from in situ PED of Pt were found to produce current densities up to 350 mA per mg of Pt, whereas the commercially available electrodes produced only up to 1.4 mA per mg of Pt (as shown in the inset of FIG. 13). This demonstrates the superior performance of the in situ fabrication technique of the present invention and the ability of this technique to achieve the efficient utilization of the electrocatalyst over commercially available methods. Furthermore, the amount of Pt loading in the commercially available electrode was found to be more than 310 times than that of the in situ PED deposited method of the present invention. This difference indicates that a fuel cell with better performances can be attained with the minimal catalyst loading if the cathode is only placed on the active sites.

Figure 14A:
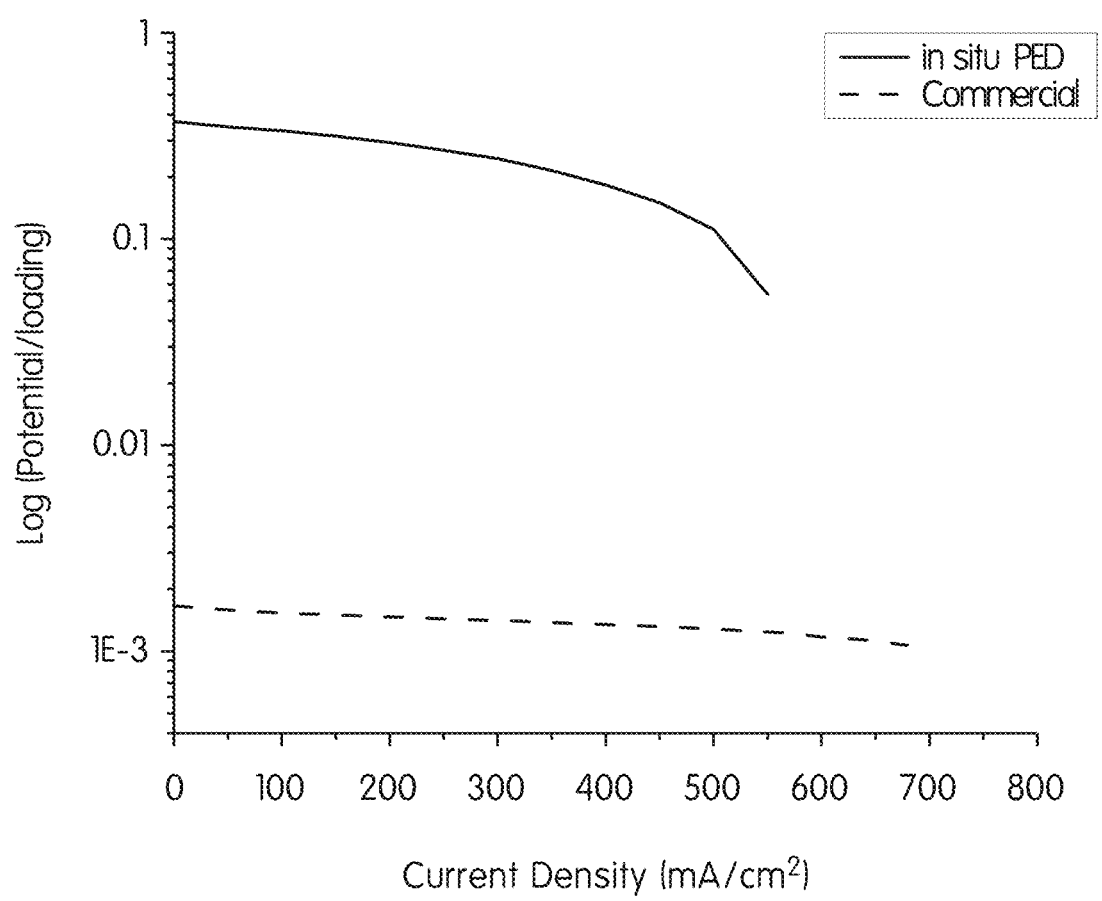
FIG. 14A is a graph showing a comparison of the normalized potential with respect to the amount of Pt loading for a fuel cell made by in situ PED of Pt in accordance with the method of the present invention and a commercial fuel cell.
Figure 14B:
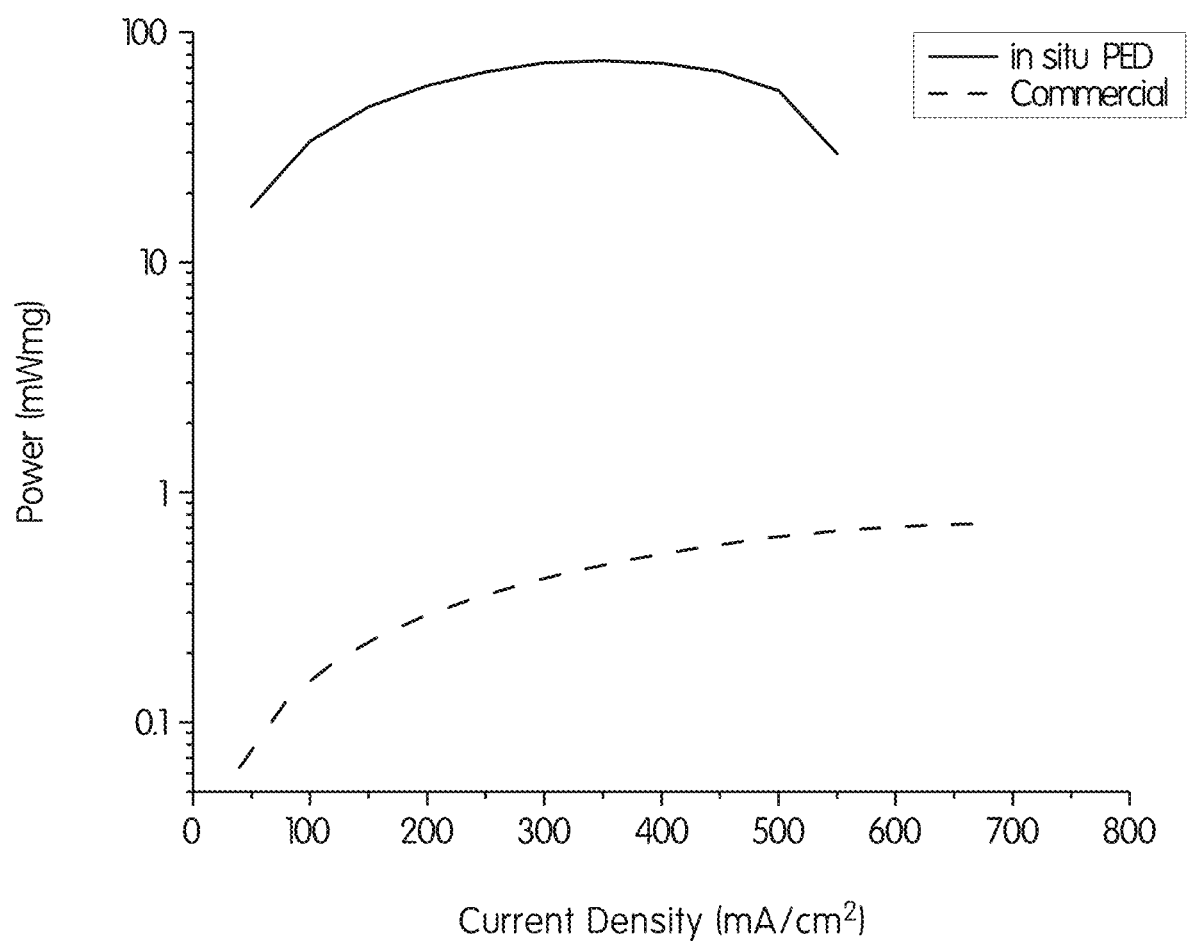
FIG. 14B is a graph showing a comparison of the normalized power with respect to the amount of Pt loading for a fuel cell made by in situ PED of Pt in accordance with the method of the present invention and a commercial fuel cell.
Figure 15A:
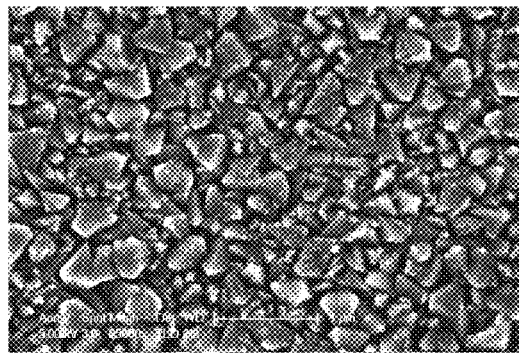
FIG. 15A is a photograph of a scanning electron microscope ("SEM") image Ru deposits obtained on fluorine doped tin oxide ("FTO") surfaces in accordance with the method of the present invention at a pulse delay intervals of 2500 μs using the pulse scheme in FIG. 6 for 5 minutes from a 1 mM aqueous solution Ru(III).
Figure 15B:
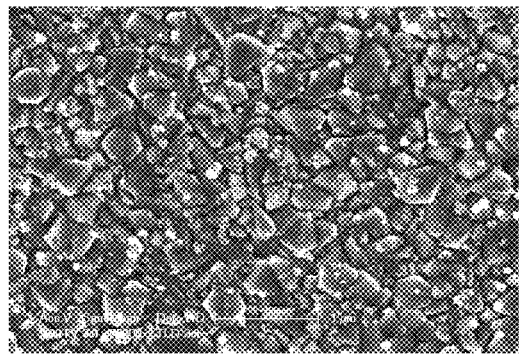
FIG. 15B a photograph of an SEM image Ru deposits obtained on FTO surfaces in accordance with the method of the present invention at a pulse delay intervals of 2500 μs using the pulse scheme in FIG. 6 for 5 minutes from a 1 mM aqueous solutions Ru(IV).
Figure 15C:
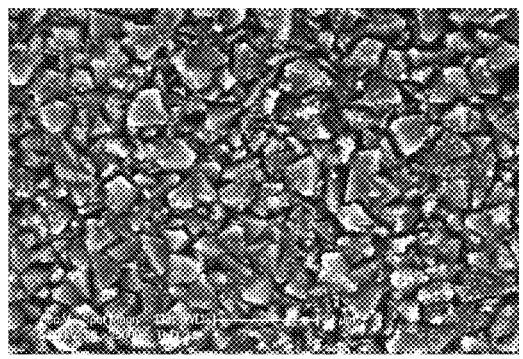
FIG. 15C is a photograph of an SEM image Ru deposits obtained on FTO surfaces in accordance with the method of the present invention at a pulse delay interval of 5000 μs using the pulse scheme in FIG. 6 for 5 minutes from a 1 mM aqueous solution Ru(III).
Figure 15D:
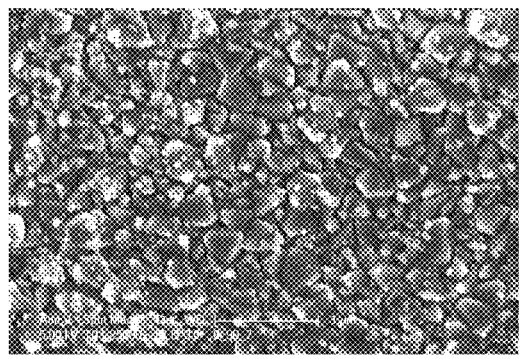
FIG. 15D a photograph of an SEM image Ru deposits obtained on FTO surfaces in accordance with the method of the present invention at a pulse delay intervals of 5000 μs using the pulse scheme in FIG. 6 for 5 minutes from a 1 mM aqueous solution Ru(IV).
Figure 15E:
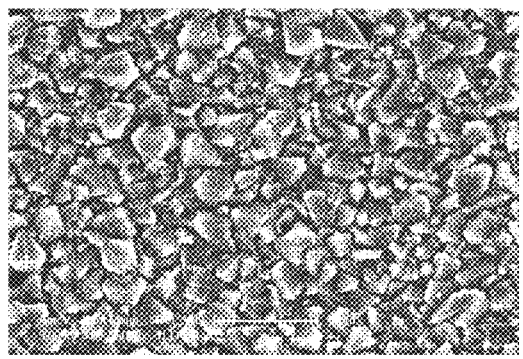
FIG. 15E is a photograph of an SEM image Ru deposits obtained on FTO surfaces in accordance with the method of the present invention at a pulse delay interval of 10000 μs using the pulse scheme in FIG. 6 for 5 minutes from a 1 mM aqueous solution Ru(III).
Figure 15F:
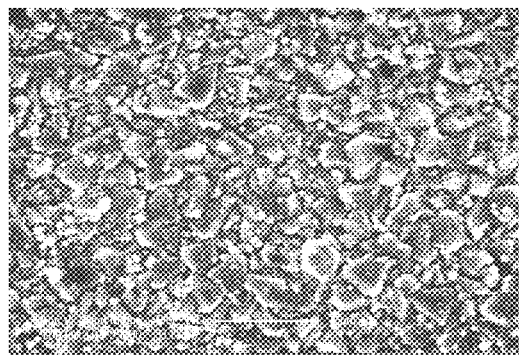
FIG. 15F a photograph of an SEM image Ru deposits obtained on FTO surfaces in accordance with the method of the present invention at a pulse delay intervals of μs using the pulse scheme in FIG. 6 for 5 minutes from a 1 mM aqueous solutions Ru(IV).

Additionally, the fuel cell made by the method of the present invention was compared with a commercially available fuel cell for power and potential obtained per mg of catalyst used, with the results shown in FIGS. 14A and 14B. These figures illustrate the normalized potential (a) and power (b) with respect to amount of Pt loading for a fuel cell made via in situ PED of Pt and as compared to a commercial fuel cell. The Y-axis is shown in log scale to indicate the higher efficiency of a fuel cell constructed in accordance with the method of the present invention. It can be observed from FIGS. 14A and 14B that a fuel cell produced by the method of the present invention has exceptional performance over the conventional fuel cell and hence has to be represented in a logarithmic scale in the Y-axis.

Figure 6:
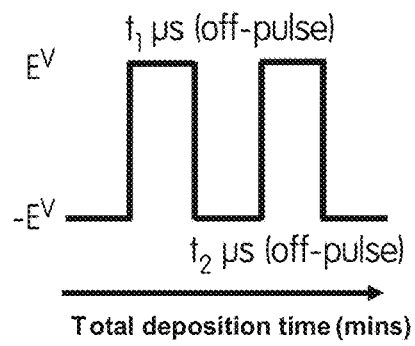
FIG. 6 is a diagram showing a sequence of voltage pulses of adjustable magnitude and duration that can be used during electrochemical deposition.

As discussed above, in another preferred embodiment of the present invention, one electrode, i.e., the cathode, can be constructed with Pt based on the deposition methods described by Ranasinghe et al, and the anode is constructed with a binary metallic mixture of Pt and Ru via a coelectrodeposition using a modified pulse wave sequence to prevent spontaneous deposition of Ru on Pt and to preserve the ideal metallic ratio (such as, without limitation, 1:1, 1:1.25, 1:2 Pt:Ru). The electrochemical deposition may be continuous or may consist of applying a sequence of voltage pulses of adjustable magnitude and duration as shown, by way of example, in FIG. 6. This procedure allows control of the size and density of the nanocrystalline deposits. Furthermore, the pulse deposition method of the present invention can be expedited relative to creation of a fuel cell by simultaneously depositing an electrocatalyst on two or more electrodes that are affixed to respective carbon electrodes (i.e., to make half membrane electrode assemblies), and then create a final fuel cell by hot pressing together the half membrane electrode assemblies that face each other. In one preferred embodiment, the fuel cell electrodes will be manufactured in house via a blend of carbon cloth, carbon powder and Nafion® liquid polymer.

Testing was also performed of variations in the deposition of both Pt and Ru. In this respect, optimum parameters for Ru deposition were used to deposit both Pt and Ru on fluorine doped tin oxide ("FTO") electrodes. Such optimum parameters for Ru include pulse voltage in the range −1.0 to +1.0 V and with a time range of about 5000 us (microseconds). For Pt, the optimized range includes the same pulse voltage range with a pulse width of 50-200 us (microseconds) and, more specifically, about 50 us with high-end equipment. More generally, preferred parameters for Pt deposition include a pulse width between 50-200 us, and, for Ru, 1000-5000 us. For both, pulse voltage in the range of a −1.0 to +1.0 V is preferred. In one preferred embodiment, the total deposition time per electrode is 10-13 minutes. This time can vary, though. For example, the fuel cell that was manufactured in accordance with the method of this invention and tested, as described above, had a total deposition time per electrode of 30 minutes.

In this context, three deposition conditions were utilized, as set forth below.

First, the deposition of Pt was followed by Ru. Specifically, Pt was deposited first from a 1 mM solution of $H_2PtCl_6$ in 0.5M $H_2SO_4$ for 3 minutes followed by deposition of Ru either from 5 mM solution of Ru(III) or Ru(IV) for 7 minutes.

Second, the deposition of Ru was followed by Pt. Specifically, Ru was deposited from a 5 mM solution of Ru(III) and Ru(IV) for 7 minutes followed by Pt from 1 mM $H_2PtCl_6$ in 0.5M $H_2SO_4$ for 3 minutes.

Third, a codeposition of Pt and Ru was made. In particular, a mixture of 1 mM $H_2PtCl_6$ and 5 mM Ru(III) or Ru(IV) solutions was mixed in a molar ratio of 10%:90% and PED performed for a total deposition time of 5 minutes.

The first and second depositions were done according to the pulse scheme given in FIG. 7 with pulse widths of 50 µs for Pt and 5000 µs for Ru. For the third codeposition condition, the pulse delay time was 5000 µs. Once a deposition was completed, the progress was analyzed by cyclic voltammetry ("CV") in 0.5M $H_2SO_4$ and energy dispersive x-ray diffractometry to characterize the surface composition of Pt and Ru. Since Ru particles were found to strip from the electrode surface easily, scanning region of CV was confined in between −0.2V to 0.8V for all three deposition conditions.

PED of Ru from its respective chloroanionic solutions on FTO electrodes was found to produce small Ru particles at pulse delays starting from 2500 μs as a minimum. The SEM images in FIGS. 15A-F show Ru deposits obtained on FTO surfaces at pulse delay intervals of 2500, 5000 and 10000 μs using the pulse scheme in FIG. 6 for 5 minutes from 1 mM aqueous solutions Ru(III) (FIGS. 15A, 15C and 15E) and Ru(IV) (FIGS. 15B, 15D and 15F), respectively.

Figure 16:
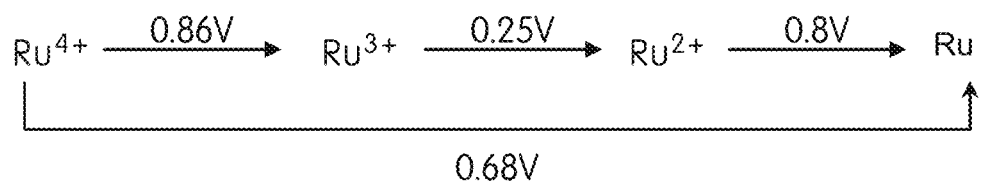
FIG. 16 is a diagram showing the different oxidation levels of Ru and its corresponding standard reduction potentials (E°).

The Ru deposits obtained from Ru(IV) appear to form particle aggregates at the edges of the platelet FTO surface more selectively than particles formed from Ru(III). The reduction potential scheme for Ru is given in FIG. 16, which represents the various oxidation states of Ru and the standard reduction potentials.

Figure 17A:
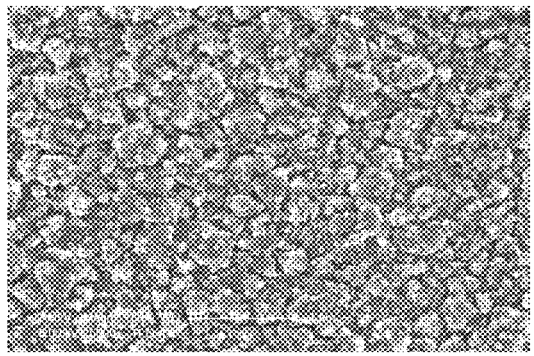
FIG. 17A is a photograph of an SEM image of Ru deposited from an aqueous 5 mM solution of Ru(III) on FTO for 5 minutes.
Figure 17B:
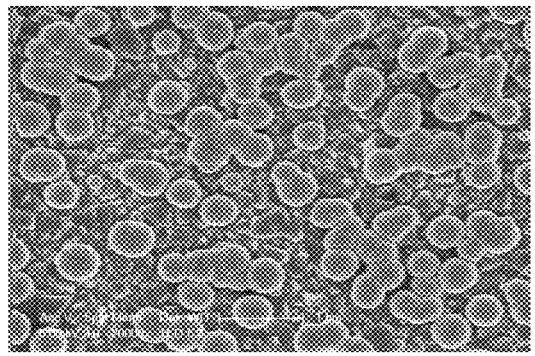
FIG. 17B is a photograph of an SEM image of Pt deposited from an aqueous 5 mM solution of Pt(IV) on FTO for 5 minutes.

A distinct difference between Ru and Pt deposits is the morphology. FIGS. 17A and 17B show, respectively, the SEM images of (a) Ru deposited from and aqueous 5 mM solution of Ru(III) and (b) Pt from an aqueous 5 mM solution of Pt(IV) on FTO for 5 minutes. Ru and Pt deposited on to FTO electrodes using 5 mM solutions made in DI water. A pulse delay of 5000 μs for Ru was chosen and the pulse delay for Pt was 50 μs. The current density applied in both cases was 0.384 A/cm$^2$. From FIGS. 17A and 17B, it is clear that Ru deposition led to formation of many small particles on the electrode surface whereas Pt deposition resulted in large particles.

The Pt and Ru codeposition condition was used to investigate the surface composition of Pt and Ru and the particle size with the goal of constructing a functioning DMFC.

Figure 18A:
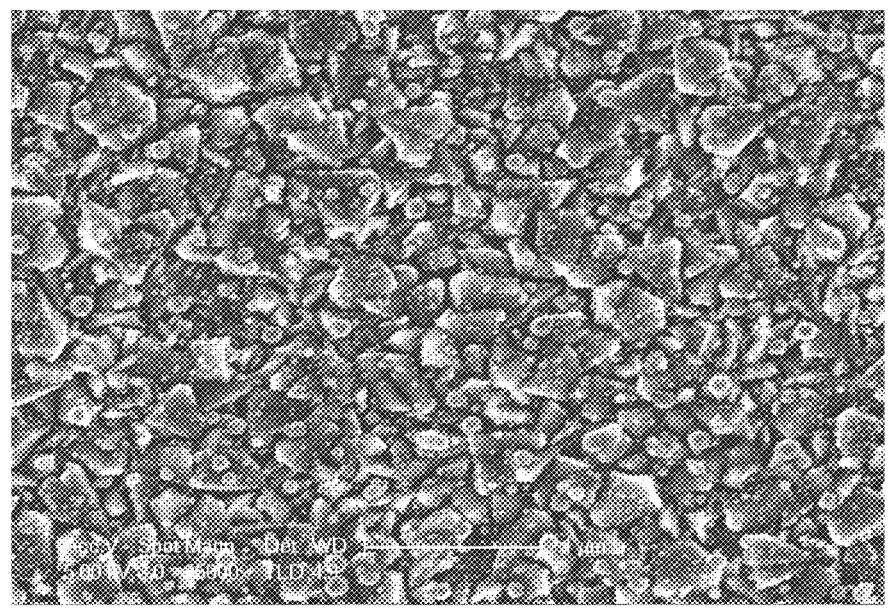
FIG. 18A is a photograph of SEM image of the deposition of Pt followed by Ru(III) and the corresponding cyclic voltammetry ("CV") curve obtained in 0.5M $H_2SO_4$.
Figure 18A:
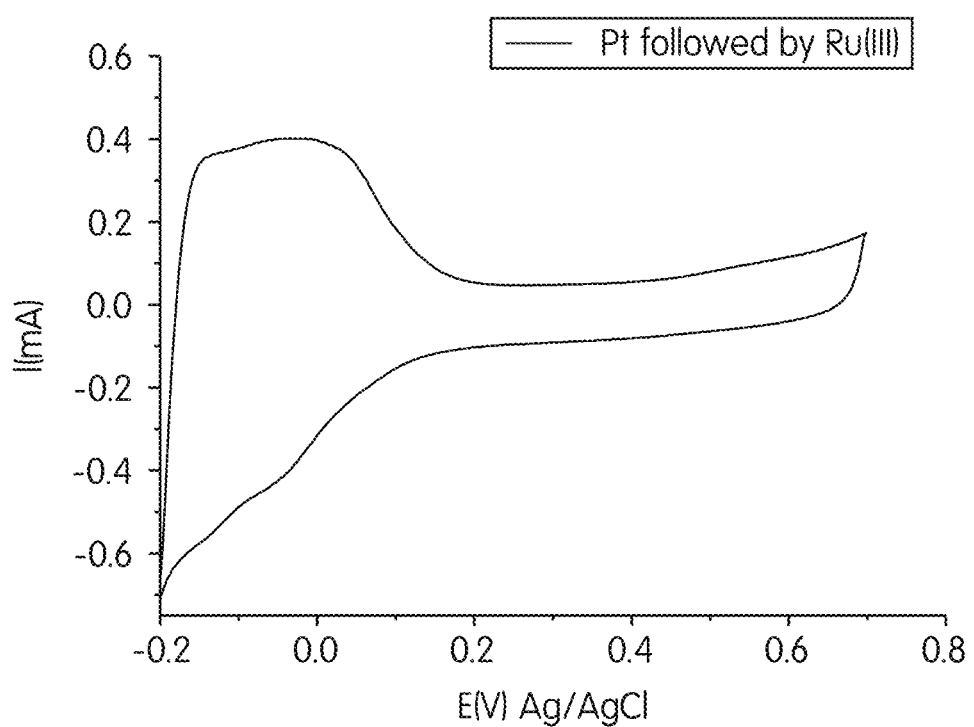
Figure 18B:
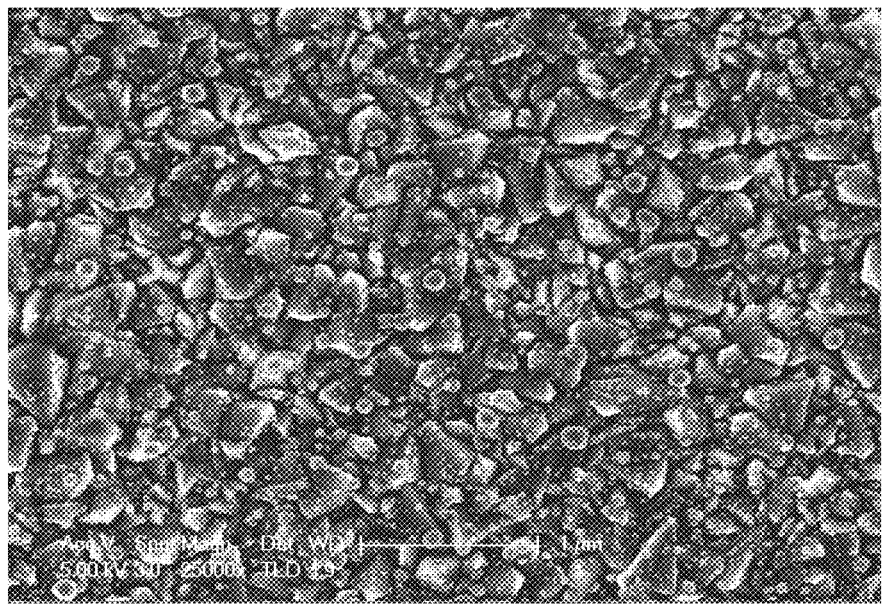
FIG. 18B is a photograph of SEM image of the deposition of Pt followed by Ru(IV) Pt and the corresponding CV curve obtained in 0.5M $H_2SO_4$.
Figure 18B:
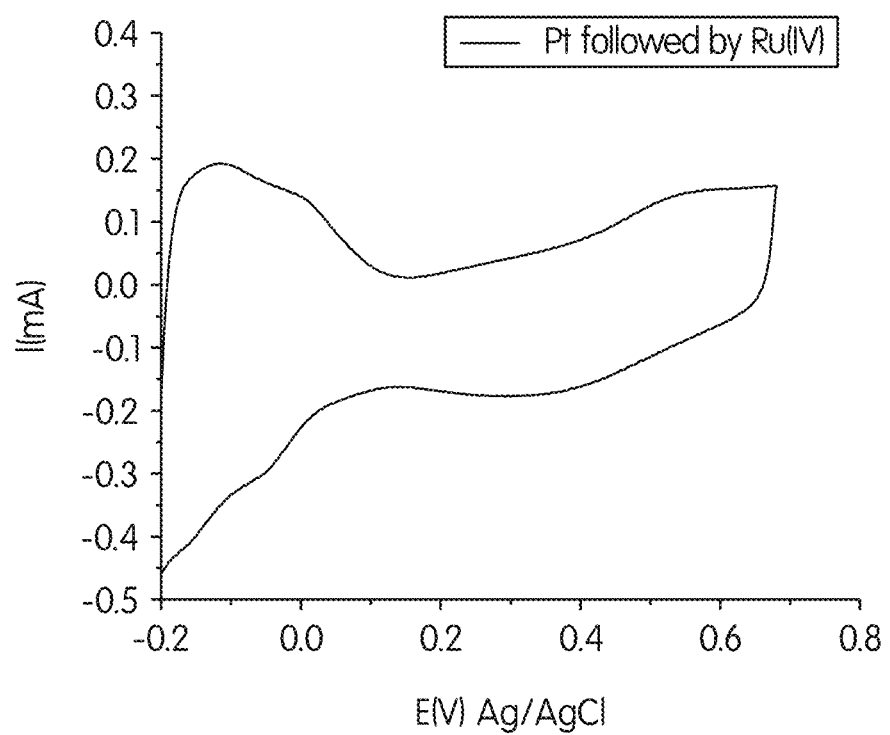

The SEM images and corresponding CV curves obtained for the deposition of Pt followed by Ru are given in FIG. 18A (Pt followed by Ru(III)) and FIG. 18B (Pt followed by Ru(IV)) respectively. Distribution of Pt particles was lower on the electrode surface whereas Ru was found to distribute evenly throughout the electrode surface and on top of Pt deposits. The CV curves in 0.5M $H_2SO_4$ show the disappearance of the PtO reduction peak and the disappearance of the hydrogen adsorption-desorption region, confirming that Ru was successfully on top of Pt particles to produce a metallic mixture.

Figure 19A:
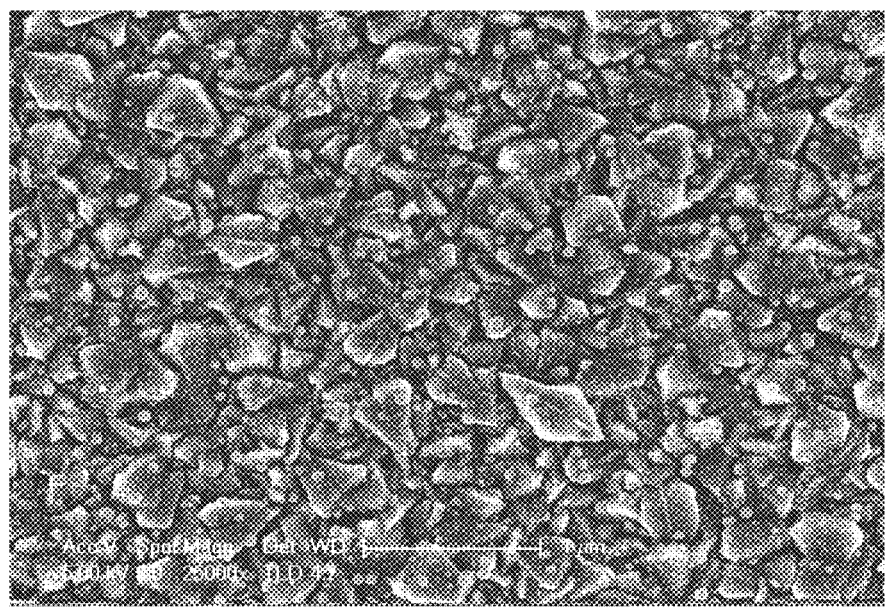
FIG. 19A is a photograph of SEM image of the codeposition of Ru(III) followed by Pt and the corresponding CV curve obtained in 0.5M $H_2SO_4$.
Figure 19A:
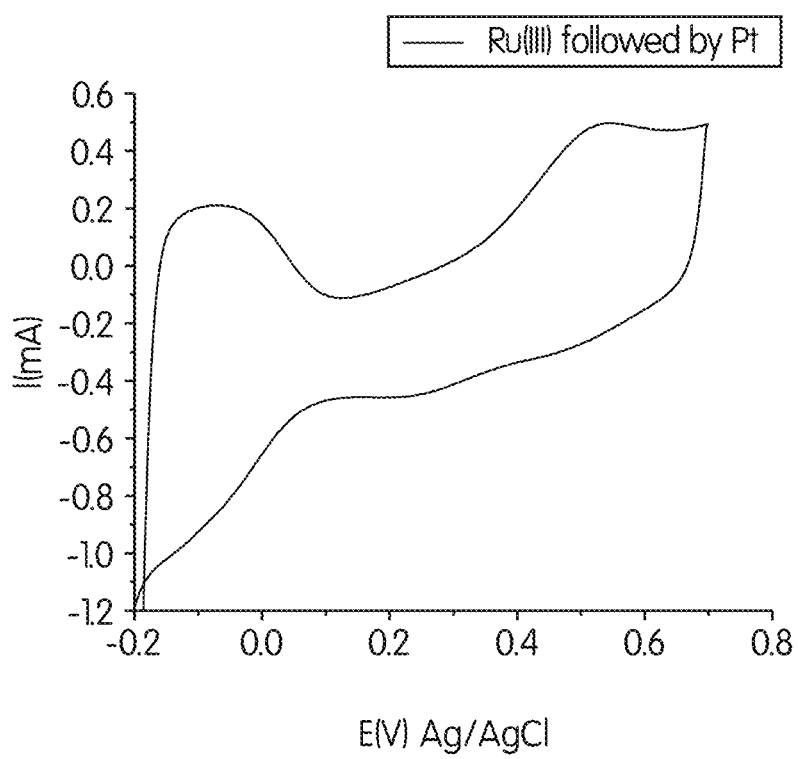
Figure 19B:
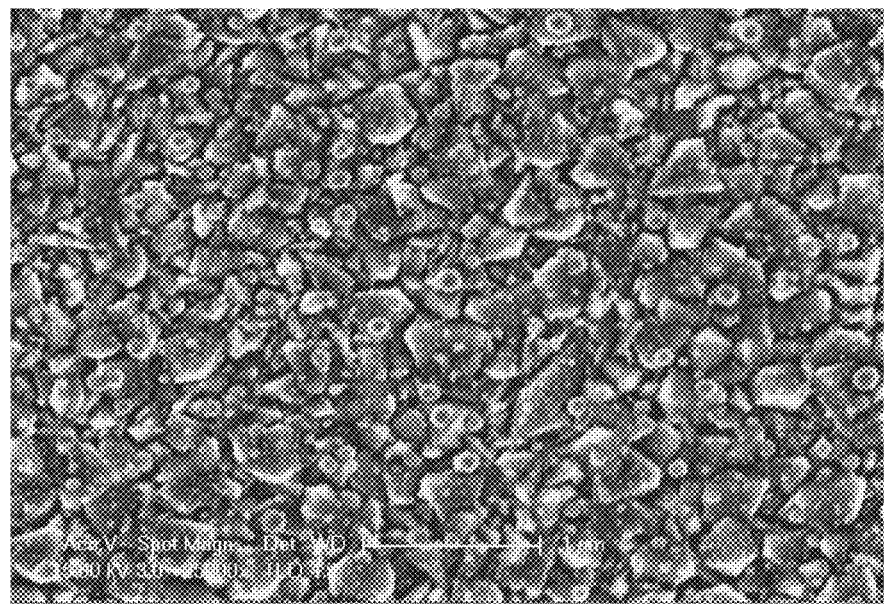
FIG. 19B is a photograph of an SEM image of the codeposition of Ru(IV) followed by Pt and the corresponding CV curve obtained in 0.5M $H_2SO_4$.
Figure 19B:
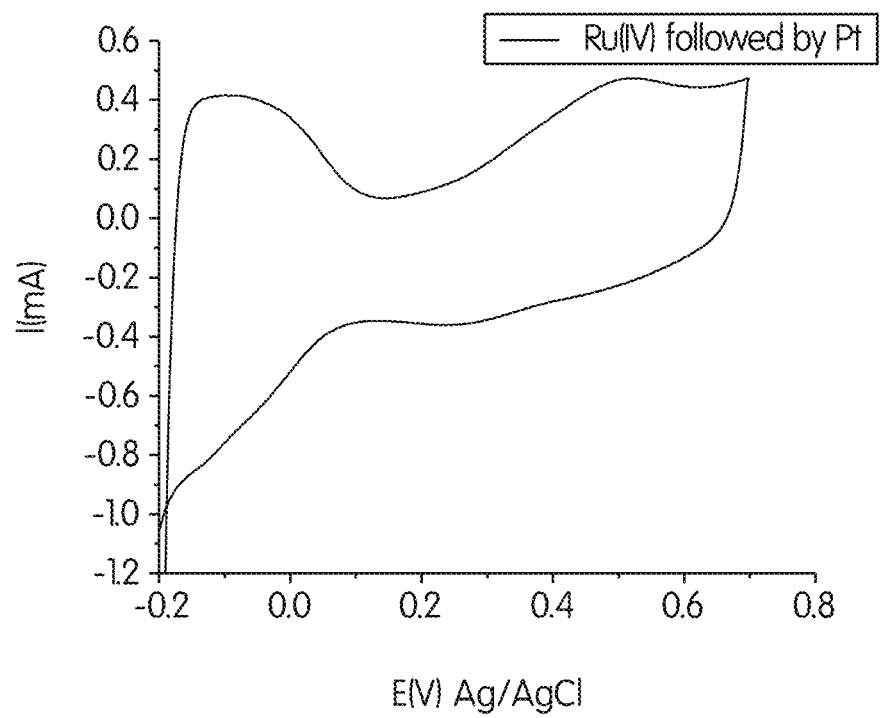

Similarly, the SEM images from the deposition of Ru followed by Pt, as shown in FIGS. 19A and 19B, indicate an even and a greater distribution of Ru deposits throughout the electrode surface for Ru(III). In particular, FIG. 19A shows an SEM image of Ru(III) followed by Pt; and FIG. 19B shows an SEM image of Ru(IV) followed by Pt. The corresponding CV curves obtained in 0.5M $H_2SO_4$ also are shown in FIGS. 19A and 19B Ru(IV) was found to have similar features with a smaller distribution of Ru particles on the electrode. A slight current was observed in the PtO reduction region, suggesting a minimal deposition of Pt on the electrode surface and on Ru particles.

Figure 20A:
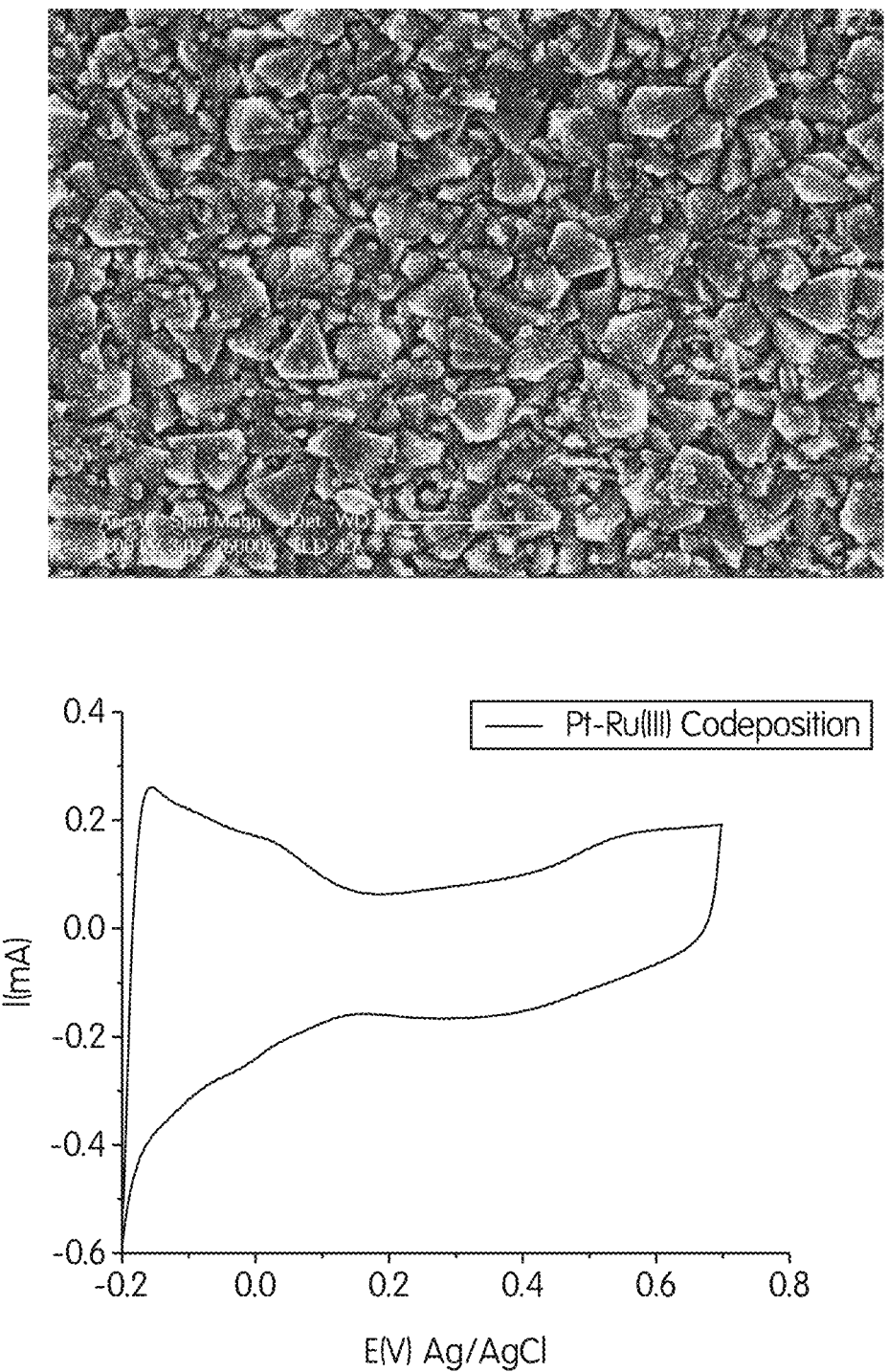
FIG. 20A is a photograph of an SEM image of the codeposition of Ru(III) and Pt and the corresponding CV curve obtained in 0.5M $H_2SO_4$.
Figure 20B:
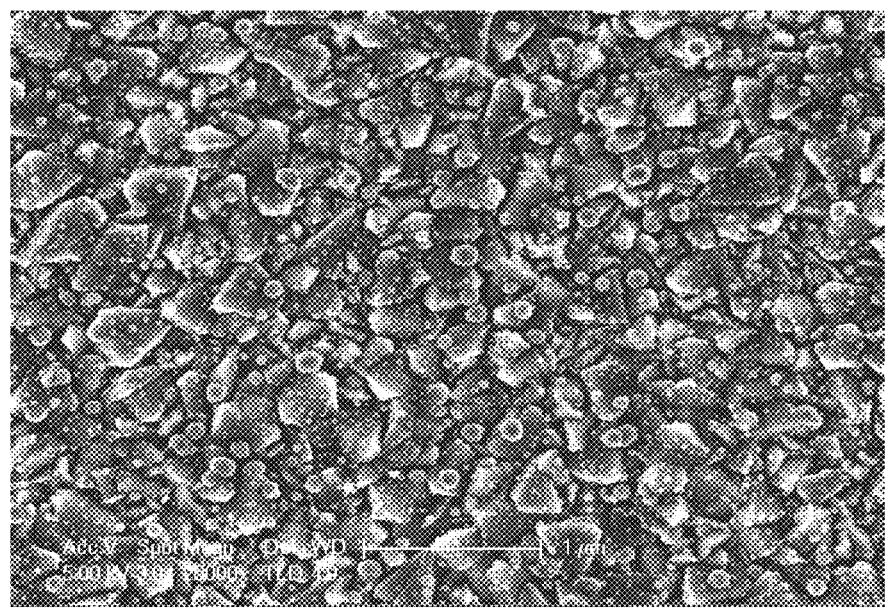
FIG. 20B is a photograph of an SEM image of the codeposition of Ru(IV) and Pt and the corresponding CV curve obtained in 0.5M $H_2SO_4$.
Figure 20B:
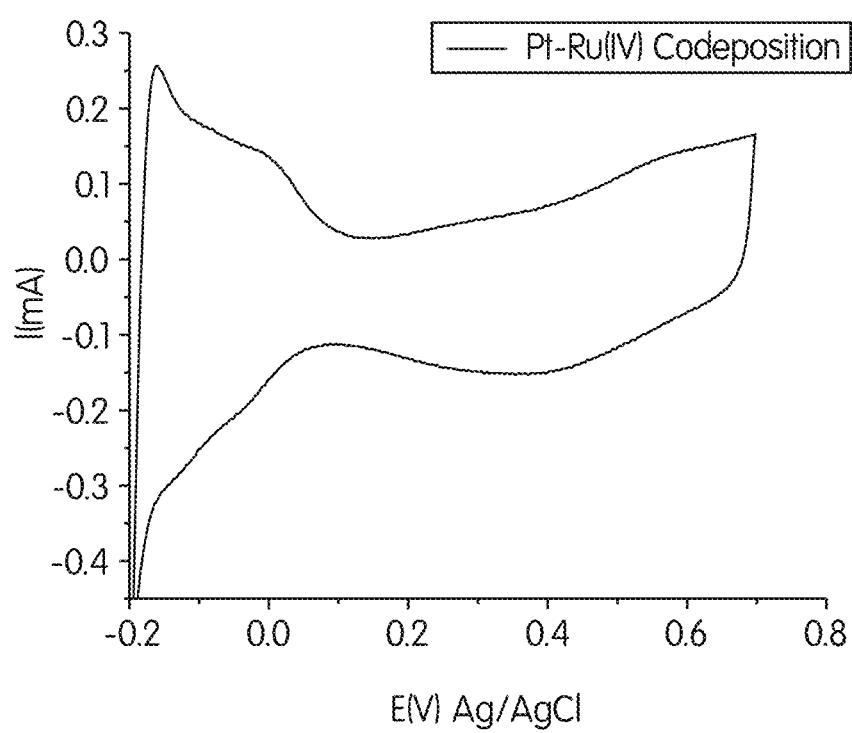

Codeposition of Pt and Ru was found to work as well as deposition of Pt and Ru separately. The corresponding CV curves suggest that all particles exist as alloy species as it exhibits mixed features of Pt and Ru, as shown in FIGS. 20A and 20B. In particular, FIG. 20A shows an SEM image of codeposition of Ru(III) and Pt; and FIG. 20B shows an SEM image of the codeposition of Ru(IV) and Pt. The corresponding CV curves obtained in 0.5M $H_2SO_4$ also are shown in FIGS. 20A and 20B The SEM images in FIG. 20 show the even distribution of Ru as well as Pt. Consistent with previous results the distribution of Pt was less than that of Ru. The smaller distribution of Pt is attributed to the finding that Pt prefers to reduce/deposit on Pt particles opposed to reducing on the electrode surface, due to the higher potential energy difference between the conduction band of Pt and the valence band of the electrode.

Figure 21:
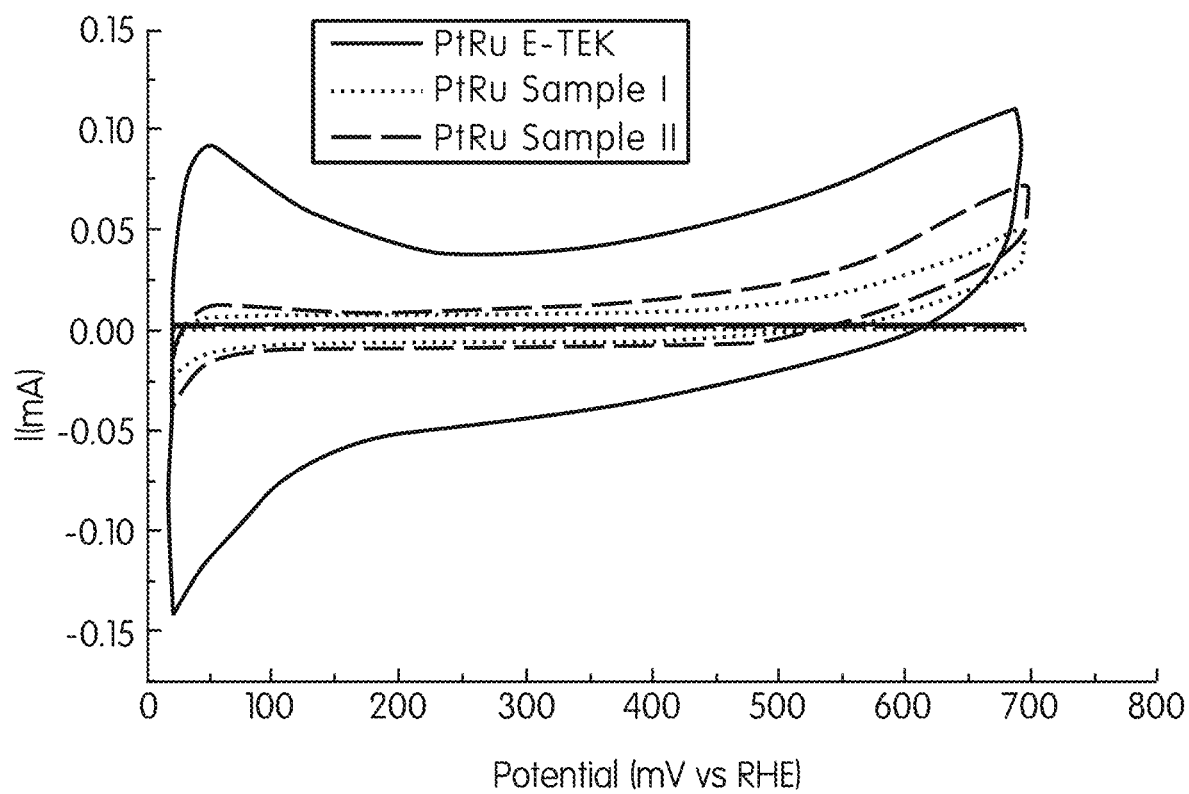
FIG. 21 is a graph showing the CV curves for different proportions of Pt:Ru manufactured commercially (PtRu E-TEK), and the results of the two codeposition samples corresponding to FIGS. 20A and 20B.

To compare the progress of the codeposition condition, the CV curves of the codeposition samples corresponding to FIGS. 19A and 19B were compared with previously reported data for a Pt:Ru 1:1 mixture on Vulcan® XC 72 (PtRu E-TEK), as shown in FIG. 21. In particular, FIG. 21 shows CV curves obtained for different proportions of Pt:Ru manufactured commercially (PtRu E-TEK), and the results of the two codeposition conditions or samples were found to nearly consistent with commercially available Pt—Ru alloys.

The method and procedure of the present invention has several advantages over existing technology. First the method of the present invention minimizes noble metal loading. In particular, materials are only deposited at sites where they are in contact with the conducting channels in the membrane; therefore, no rare and expensive noble metals (Platinum and Ruthenium) are wasted. In addition, the grain size of the material particles can be controlled and optimized for maximizing current density, which again makes best use of the rare metal.

Second, the method of the present invention reduces manufacturing costs because the complete fuel cell is constructed as a unit using low cost electrochemical means. This provides for rapid, reliable, and low cost mass manufacturing. In addition, the device may be effectively tested during its construction by CV analysis allowing parallel quality control. Also, the minimized amount of noble metal catalyst per square centimeter will be between a factor of 3 to 6, without altering the performance of the cell; thus, the materials cost is reduced.

Finally, the method of the present invention can be utilized to deposit metal particles through any porous membrane.

Furthermore, as shown in FIGS. 5 and 10, the technique of the present invention allows for construction of the first direct methanol fuel cell that is made from pulse electrochemical deposition using various deposition schemes. This fuel cell represents the first ever codeposition of metals to generate metal nanoclusters that can reduce or minimize the carbon monoxide poisoning of the Pt particles at the anode.

Potential applications of the method of the present invention can range from portable fuel cell based power supplies to power packs that could power houses or vehicles.

Additionally, apart from pulse deposition through the membrane on to the electrode surface, one can codeposit directly on the electrode surface to construct a fuel cell similar to known industrial methods, but still the amount of catalyst loaded will be at least 3 times less than the industry standard and significantly less particles will be wasted.

It will be understood that each of the method steps of the invention described above, or two or more together, may also find a useful application in other types of applications differing from the types described above. While the invention has been illustrated and described as preferred embodiments, it is not limited to the details shown, since it will be understood that various omissions, modifications, substitutions and changes in the details of the methods described and illustrated and their operation can be made by those skilled in the art without departing in any way from the spirit of the present invention.

What is claimed is:

1. A method of producing an electrochemical fuel cell device with at least two electrodes containing one or more electrocatalysts, the method comprising the steps of:

affixing a semi-permeable membrane with inhomogeneous conduction pathways to a conducting surface of a first electrode in a predetermined configuration to form a first electrode assembly;

immersing the first electrode assembly in a first electrolyte containing at least one electrochemical precursor selected from the group consisting of ruthenium and ruthenium alloys with corresponding precursor ions suitable for forming an active electrocatalyst on the conducting surface of the first electrode;

affixing a semi-permeable membrane with inhomogeneous conduction pathways to a conducting surface of a second electrode in a predetermined configuration to form a second electrode assembly;

immersing the second electrode assembly in a second electrolyte containing at least one electrochemical precursor selected from the group consisting of ruthenium and ruthenium alloys with corresponding precursor ions suitable for forming an active electrocatalyst on the conducting surface of the second electrode;

electrochemically depositing an electrocatalyst on the conducting surface of the first electrode and of the second electrode, through an electrochemical reduction reaction, by applying a potential to the first electrode and to the second electrode to attract and guide precursor ions through the inhomogeneous conduction pathways in the semi-permeable membrane to the conducting surfaces of the first electrode and of the second electrode; and joining the first electrode assembly and the second electrode assembly to form a direct methanol fuel cell.

2. The method of claim 1, wherein the method further comprises the step of coupling the first and second electrode assemblies, after the electrocatalyst deposition, by a porous coupling layer to form a direct methanol fuel cell.

3. The method of claim 1, wherein the first and second electrode assemblies are attached to the same semi-permeable membrane before the electrocatalyst deposition.

4. The method of claim 1, wherein the step of electrochemical deposition involves pulse electrochemical deposition whereby a sequence of voltage pulses of adjustable magnitude and duration are applied.

5. The method of claim 3, wherein the parameters for pulse electrochemical deposition of ruthenium include a pulse voltage range of −1.0 to +1.0 V and a pulse width of between 1000-5000 us.

6. The method of claim 3, wherein the parameters for pulse electrochemical deposition of ruthenium include a pulse voltage range of −1.0 to +1.0 V and a pulse width of about 5000 us.

7. The method of claim 1, wherein the ruthenium alloy is selected from the group consisting of a binary, ternary and quaternary metal solution.

* * * * *